April 16, 1968   R. L. MEFFERD   3,378,063
THERMOSTAT CONTROL VALVE
Filed Jan. 10, 1966
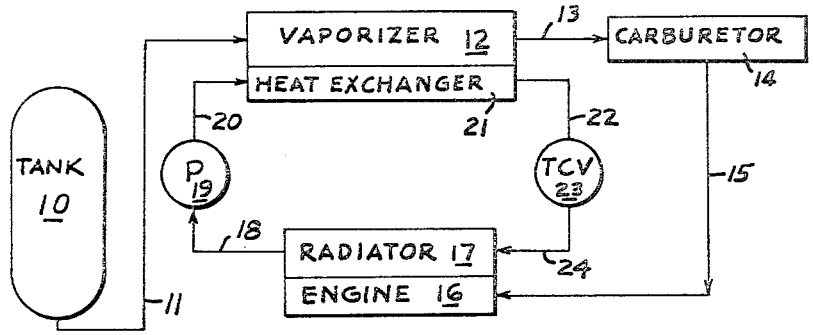
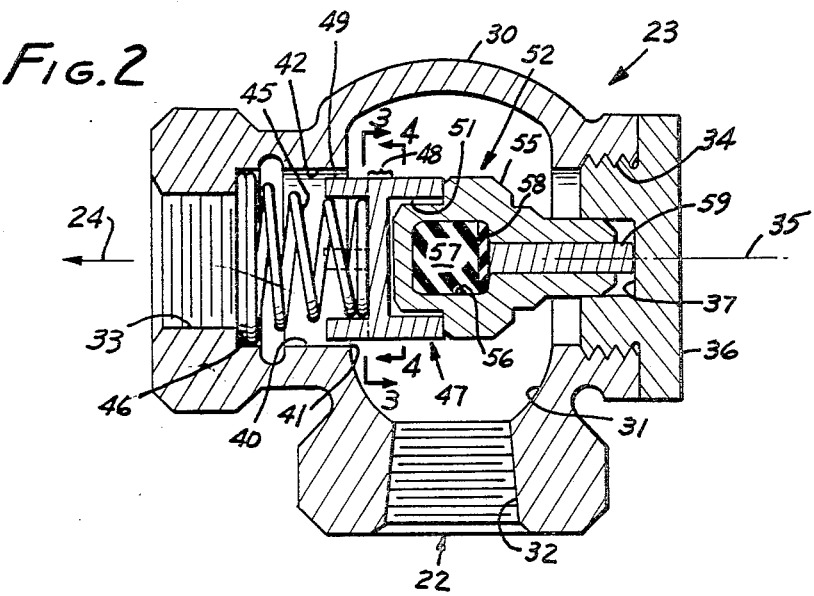
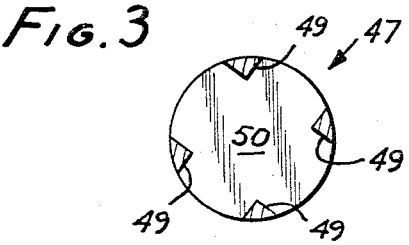
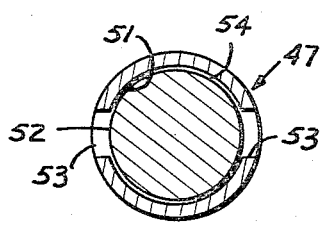
INVENTOR.
RICHARD L. MEFFERD
BY
ATTORNEYS.

United States Patent Office 3,378,063
Patented Apr. 16, 1968

3,378,063
THERMOSTAT CONTROL VALVE
Richard L. Mefferd, 9209 E. Ramona,
Bellflower, Calif. 90706
Filed Jan. 10, 1966, Ser. No. 519,593
4 Claims. (Cl. 165—40)

This invention relates to systems which utilize liquified gas, and to a thermostat control valve for use in said system.

Internal combusion engines which are powered by a combustible gas which is initially liquified are widely known. An example of such gases is the familiar LPG (liquified petroleum gas) which constitutes a mixture of hydrocarbons which are gases (or vapors) at engine inlet pressures and temperatures. The terms "vapor" and "gas" are used interchangeably herein to denote a condition wherein the fuel can readily be mixed with air to form a combustion charge. This invention is especially well suited to the use of LPG, but it should also be understood that it is also suitable for use with any other combustible initially liquified gas, other common examples being ethane, methane, propane and butane, as well as mixtures thereof.

One of the difficulties of long standing in the use of liquefied gases as a fuel for an internal combustion engine springs from the inherent fact that when the gas is converted to a vapor, as it must in order to be carburetted and burned, there is a refrigerant action. It obviously is necessary to supply heat in order to vaporize the liquefied material. However, there are inter-acting parameters, such as rate of demand and temperature of the engine which render variable the conditions at a vaporizer. It is not uncommon to supply the necessary heat from radiator water, but when a heavy demand for fuel is exerted, especially when the engine was cold, it has been common for the vaporizer regulator to be frozen by the vaporizing gas and for the casting to crack. So troublesome has this situation been that a patent was even granted for the inclusion of a freeze plug in the vaporizer to relieve pressure which might tend to crack the casting.

Manufacurers began to seek ways to avoid the above difficulty, and failing to solve it, many simply attempted to operate the vaporizer regulator at such a high temperature that it was unlikely the vaporizer would ever freeze up. However, this meant that the vaporizer would always operate at a high temperature, and also that it might not be able to supply adequate fuel at low engine temperatures. The latter, of course, results in a diminished energy output from the engine, and the former puts out fuel at a high enough temperature that it adversely affects the temperature of the fuel air mixture, thinning it out and also diminishing the output.

Furthermore, during prolonged idling of engines, the temperature will increase in the engine and in the engine compartment. When heavily loaded engines return to idle, the temperature can elevate to the boiling point, at which time the amount of fuel to be vaporized is the lowest. The fuel will therefore follow the vaporizer temperature and cause an erratic air fuel ratio which upsets idling, and makes it difficult to restart the hot engine if it is shut down. Similarly, when an engine is accelerated, it comes up to higher speed or load, and in order to accomplish this, the fuel and air must also accelerate from a slow to a higher speed. If the fuel temperature is high resulting from an overheated vaporizer, the air fuel mixture will be lean, and the result is sluggish acceleration.

There are additional complications which include improper and incomplete combustion with an adverse effect on economy and the composition of exhaust gases, lessening of engine life when the ratio is excessively lean, and the leaving behind in the vaporizer of residues as a result of vaporizing the lighter fractions and leaving behind the heavier fractions when the vaporizer attains too high a temparature.

Evidently, the system requires a close control over the vaporizer, in response to engine operating conditions, which vaporizer can maintain the fuel air mixture at a substantially constant temperature. The ratio will then not be upset as a function of immediately previous operating conditions. It is an object of this invention to provide a system which is operated in this manner, and a thermostat control valve for said system.

This invention includes in combination a source of liquefied gas and a vaporizer which receives liquefied gas from this source. A carburetor receives the vaporized gas from the vaporizer, and there is a heat exchanger in operative relationship with the vaporizer so as to supply heat thereto. A source of heated fluids supplies said fluid to the heat exchanger. A thermostat control valve controls the flow of fluid through the heat exchanger.

The thermostat control valve itself comprises a body which has an internal chamber and an inlet port and an outlet port that open into said chamber. A valve port in the chamber between the inlet and the outlet is provided between the inlet and the outlet ports. A valve element is placed in the chamber, this valve element having an axis of motion. The valve element is axially movable relative to the valve port so as to adjust the flow rate therethrough. A return spring is axially opposed to the valve element and biases in toward a valve-open position. A temperature-responsive axial-force actuator is opposed between the body and the valve element on the opposite side of the valve element from the return spring. The inlet port and the actuator are in fluid communication with each other. Increasing temperature causes expansion of the actuator to move the valve element against the return spring and thereby to cause the valve member to reduce the flow rate through the outlet.

According to a preferred but optional feature of the invention, the valve element, return spring and valve part are axially aligned with each other.

According to still another preferred but optional feature of the invention, the valve element includes a piston portion reactive with the valve port for at least a part of their respective lengths. The diameters being different from each other so that there is a bleed passage through the valve element regardless of their axial relationship.

The above and other features of this invention will be fully understood from the following detailed description and the accompanying drawing in which:

FIG. 1 is a schematic illustration of a system according to the invention;

FIG. 2 is an elevation principally in cutaway cross-section showing a portion of the system of FIG. 1; and FIGS. 3 and 4 are cross-sections taken at lines 3—3 and 4—4, respectively, of FIG. 2.

FIG. 1 illustrates the presently preferred embodiment of a system according to the invention. The system includes a pressure tank 10 holding a liquefied gas. Contents of the tank flow through line 11 to a vaporizer 12. The vaporizer includes an expansion valve and a pressure regulator. Vaporized gases flow from the vaporizer through line 13 to carburetor 14 where the vaporized fuel is mixed with air and the charge is supplied through line 15 to engine 16. An engine radiator 17 forms a portion of a recirculation system which obtains waste heat from the engine and circulates the water through line 18 to water pump 19, which pump forces the heated fluid (radiator water) through line 20 and heat exchanger 21, through line 22, through thermostat control valve 23, and thence through line 24 to return to the radiator. Of course, any other source of heated liquid would do as well, but radiator water will usually be present and preferred.

Thermostat control valve 23 is shown in greater detail in FIGS. 2 and 3. It includes a body 30 with an internal chamber 31. An inlet port 32 and outlet port 33 enter into the chamber, preferably at right angles to each other. An access port 34 opens into the internal chamber on a side opposite the outlet port. The valve includes an operating axis 35.

The ports are threaded so as to receive appropriate connections. Inlet port 32 is connected to line 22, and outlet port 33 is connected to line 24. A plug 36 closes the access port. This plug has a recess 37 on its inner face, centered on axis 35.

The function of the valve is to control flow from line 22 to line 24 and thus the rate of flow through the vaporizer. To accomplish this function, there is provided within the valve body a valve port 40, which valve port includes a valve edge 41 which is preferably circular. In addition, the valve port includes a cylindrical wall 42 adjacent to edge 41. A return spring 45 is seated on a seat 46 adjacent to the outlet port. As can be seen from the drawings, the return spring is non-linear in nature, which is to say that it has a variable rate. As the compression of the spring increases, so does the amount of force needed for the next increment of linear reduction in length. This type of spring renders non-linear the relationship between spring length and force applied, so that there is less change in length under compression than would be the case with the same change in load at a lesser initial load.

The return spring is in opposition between the body and a valve element 47. The valve element includes an external piston portion 48 which has an outer diameter that is somewhat less than that of the cylindrical wall 42. It has been found convenient to make this difference an annulus approximately 0.001" wide. To the left of piston portion 48 in FIG. 2 are four guide legs 49 (FIG. 3) which always stand in the valve port. The regions of face 50 within the legs are pressed by the spring. The guide legs serve to guide the valve elements in the valve port and to center the spring.

A recess 51 is bored in the opposite face of the valve element to form a seat for a temperature-responsive axial force actuator 52. Slots 53 are cut through the wall of the valve element so that heated fluid from inlet port 32 discharges against the side of the axial force actuator so as to give a quick response to thermal variations. A clearance 54 is formed between the recess and the actuator so that fluid can flow therethrough. Then flowing water continually bathes the temperature-sensitive region of the actuator.

The axial force actuator is itself opposed between the valve element and the body, its force on the body being exerted against plug 36. This valve actuator is preferably of the type which utilizes the melting of a thermostatic material such as a wax as a means for temperature-sensitive expansion. When the wax changes state, it expands. On a device approximately ½" in diameter, it is possible to secure an axial movement of approximately 0.110" over about a 20° F. range. Within this range, the amount of extension is quite accurately predictable.

Customarily, such a device includes a body 55 with an internal chamber 56 filled with a wax 57. A diaphragm 58 seals the chamber and bears against a piston 59, the piston being opposed between the diaphragm and the body. Expansion of the wax will cause a longitudinal (axial) extension of the device, exerting a pressure upon the valve element to close the valve.

Devices of this type are obtainable from American Standard Controls Division, 5900 Trumble Ave., Detroit, Mich. The thermostat control valve is so proportioned that when the temperature is as high as it should be, the piston portion of the valve element will lie within the cylindrical wall 42 of the valve port. Further overtravel of the valve element will have no effect on the flow rate, because there is a constant bleed of a given amount through the annular gap formed between the piston portion of the valve element and the cylindrical wall. It is principally for this reason that the non-linear spring is provided to reduce the overtravel. Axial force actuators of the class shown are sensitive to overtravel and wear out quickly if fully extended too often. Therefore, it is desirable to cut down the total excursion, especially as it is immaterial to the valving function.

Similarly when the temperature is too low, this valve will open fully by withdrawing the piston area from the valve port substantially as shown in FIG. 2 (FIG. 2 indicating a full open condition of the valve). Further travel to the right in FIG. 2 would have no appreciable or important effect on the flow, because the liquid is bypassing the piston area and flowing between the guide legs to the valve port. Therefore, the control exerted by the valve is essentially that which is exerted between the position shown in FIG. 2 and that which would occur when face 50 is about axially aligned with valve edge 41. Thus, a very sensitive valve can be obtained which requires only a small control motion.

In operation, the fuel at the outlet of vaporizer utilizing thermostat control valve 23 does not exceed 100° F. under any circumstances, thus providing a good control over the temperature of the fuel air mixture, and preventing the erratic behavior discussed above. This device is wide open at 90° F. and below, and makes no effort to exert any control at low temperatures. Under these situations, it is wide open because it is necessary under such circumstances to provide all the heat to the vaporizer-regulator which can be obtained. At higher temperatures, such as above about 110° F., the device is substantially fully closed (except for the bleed flow). It is important to note that under this latter circumstance, there continues to be a steady flow at low rate over the axial-force actuator. This assures that the thermostat control valve will be exposed to conditions as they actually exist in the vaporizer. A shortcoming of previous systems has been the tendency to shut off completely so that the vaporizer could freeze up completely before any signal were given to a control that flow of heating fluid should again be permitted. The device as shown thereby reduces to an unimportant length any time lag between the thermostat control valve and the vaporizer.

There are considerable advantages in the fact that the spring, valve element, valve port and actuator are all axially aligned. In previous devices which used bellows or butterflies, there has had to be a provision made for overtravel. This ordinarily required reliefs which would be filled up with rust and other detritus conventionally found in dirty radiator water. Then the overtravel feature would be disabled and the device would destroy itself. In this invention, such overtravel as there is, is into a cylindrical area aligned with an open port which is self-cleaning. Furthermore, because of the constant flow feature, the settling out of detritus is rendered unlikely.

This invention provides a vaporizer which can act at a relatively low temperature and at a relatively constant temperature, thereby carefully and closely controlling the vaporizer temperature and the temperature of the output fuel under any operating conditions, thereby greatly improving the performance of the total system.

This invention is not to be limited by the embodiments shown in the drawings and described in the description which are given by way of example and not of limitation, but only in accordance with the scope of the appended claims.

I claim:

1. In combination: a source of liquefied gas; a vaporizer receiving liquefied gas from said source; a carburetor receiving vaporized gas from said vaporizer; a heat exchanger in operative relationship with said vaporizer so as to supply heat thereto; a source of heated fluid supplying said fluid to the heat exchanger; and a thermostat control valve controlling the discharge of fluid from the heat exchanger, said thermostat control valve comprising: a body having an internal chamber and an inlet port and an outlet port opening into said chamber; a valve port in the chamber between the inlet and outlet ports; a valve element in said chamber, said valve element having an axis of motion, and being axially movable relative to the valve port so as to adjust the flow rate therethrough; a return spring axially opposed to the valve element and biasing it toward a valve-open position; and a temperature-responsive axial-force actuator opposed between the body and the valve element on the opposite side of the valve element from the return spring, the inlet port and the actuator being in fluid communication with each other, increasing temperature causing expansion of said actuator to move the valve element against the return spring, thereby to cause the valve member to reduce the flow rate through the outlet port over at least a portion of the path of the valve element.

2. A combination according to claim 1 in which the actuator, valve element, return spring, and valve port are axially aligned with each other.

3. A combination according to claim 2 in which the valve port is a circular cylinder, and in which the valve element is, for at least part of its axial length, a piston having an external cylindrical wall, the diameter of said cylinder being greater than that of said wall, thereby to leave, at all axial positions of the valve element, an opening between the inlet and outlet ports.

4. A combination according to claim 3 in which the return spring is non-linear.

References Cited

UNITED STATES PATENTS

| | | | |
|---|---|---|---|
| 2,188,072 | 1/1940 | Brown | 165—40 |
| 3,237,862 | 3/1966 | Salerno et al. | 236—93 |
| 3,238,998 | 3/1966 | Moore et al. | 165—40 |
| 3,253,647 | 5/1966 | Deshaies | 165—51 |

ROBERT A. O'LEARY, *Primary Examiner.*

C. SUKALO, *Assistant Examiner.*